Patented June 14, 1932

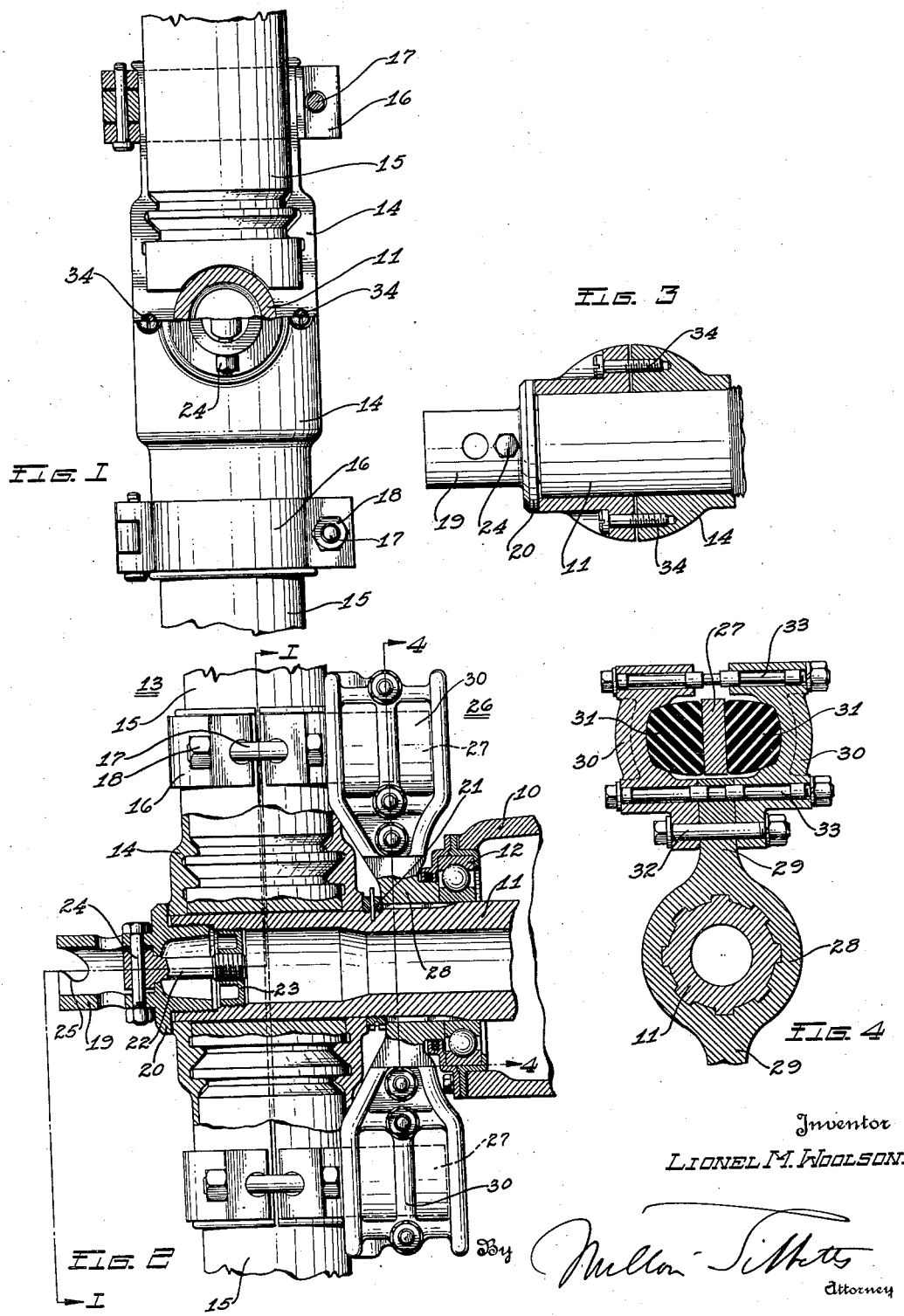

1,863,388

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

PROPELLER

Application filed August 19, 1929. Serial No. 386,861.

This invention relates to aeroplanes, and more particularly to propeller mounting and driving mechanism.

An object of this invention is to provide a driving mechanism for aeroplane propellers in which a hollow drive shaft and propeller securing means are associated in a manner such that the resulting structure is of light weight and easily assembled and disconnected.

Another object of the invention is to provide a propeller driving mechanism which includes a novel manner of securing the propeller in a desired axial relation upon a crankshaft.

A further object of the invention is to provide a propeller driving mechanism in which a shaft extension serves as a retainer and thrust element to locate the propeller axially upon the crankshaft.

A still further object of the invention is to provide a propeller driving mechanism which includes a two-part shaft, the end section of which is formed to provide a thrust bearing for the propeller and for the attachment of starting mechanism.

These and other objects of the invention will appear from the following description taken in connection with the drawing, which forms a part of this specification, and in which:

Fig. 1 is an end view of a propeller and driving mechanism therefor, partially in section, taken on line 1—1 of Fig. 2;

Fig. 2 is a side elevation of the same, a part thereof being broken away to show the details of the driving and mounting elements;

Fig. 3 is a fragmentary sectional view taken axially through the propeller structure;

Fig. 4 is a sectional view taken on line 4—4 of Fig. 2.

Referring now to the drawing by characters of reference, 10 designates an engine casing through which a crankshaft 11 extends, one end of the crankshaft being hollow and carried by the bearing 12 arranged in an opening at the end of the crankcase. It will be understood that the crankshaft is driven by an internal combustion engine in a conventional manner, and in making the end of the crankshaft hollow considerable weight is removed from such an assembly as usually the shaft is solid.

A propeller structure designated generally at 13 is mounted loosely upon the hollow end of the crankshaft projecting from the casing. A two-part hub barrel 14 is clamped together around the stems of the blades 15 and clamping members composed of two hinged sections 16 are drawn together by the bolts 17 and nuts 18 around the propeller blade stems, thereby securing them with the hub. The cap screws 34 are also provided to draw the central portions of the hub barrel together.

Retainer means is associated with the end of the hollow crankshaft for maintaining the propeller structure upon the crankshaft. A hollow shaft extension 19 is screwed into the hollow end of the crankshaft and is provided with a thrust flange 20 which with the thrust ring 21 definitely locates the propeller axially upon the crankshaft. The shaft extension is anchored to the hollow end of the crankshaft by a stud 22 which is screwed into a plug 23 which is screwed into the hollow end of the crankshaft, and by a bolt 24 which extends transversely through the shaft extension and apertures in the head of the stud. The plug serves to prevent oil in the crankcase from flowing through the projecting end of the hollow shaft.

The shaft extension, besides serving as a thrust bearing for the propeller, is provided at its end with slots 25 which provide jaws for the reception of engine starting mechanism which can be either of a hand or mechanical variety.

While the propeller is loosely mounted upon the hollow end of the crankshaft, there is a direct driving mechanism therefor extending from the crankshaft to the propeller hub. A drive transmitting member, indicated generally at 26, is arranged adjacent the rear end of the propeller and is adapted to cooperate with an extension 27 projecting rearwardly from the propeller hub clamps so that rotation of the shaft 11 will be transmitted in this manner to the propeller hub. The drive transmitting member 26 consists of a hub portion 28 which is splined or keyed to the hollow end of the crankshaft and is provided with oppositely extending arms 29. Associated with the ends of each of such arms is provided a pair of connector sections 30, and a rubber block 31 is positioned intermediate each of these connector sections and the extension 27.

Each pair of connector sections are secured to the associated arm 29 by means of a bolt 32, and in addition by one of the pair of bolts 33 which clamp the connectors in fixed relative relation slightly compressing the rubber blocks 31. It will be seen that the rubber blocks provide for a flexible drive in transmitting rotation from the hub 28 to the extension 27 so that the member 26 can be rotated slightly relative to the propeller. The flexibility of the drive will absorb torsional vibration and explosive shocks which would otherwise be transmitted from the crankshaft directly to the propeller.

It will be seen that with the structure described, I am able to utilize a light-weight crankshaft for an aeroplane propeller which is capable of withstanding high torsional stresses and engine explosive shocks. It will further be seen that I have provided a shaft and extension therefor which can be readily associated and adjusted to retain the propeller in desired axial relation upon the crankshaft and which will also serve as a jaw for the association of starting mechanism. This propeller driving mechanism is readily assembled, is strong and rugged, and of relative light weight.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

What I claim is:

1. In an aeroplane propelling mechanism, a crank shaft, a propeller rotatatbly mounted directly on said shaft, a driving means for the propeller, and means fixing the propeller axially on the shaft.

2. In an aeroplane propelling mechanism, a crank shaft, a propeller rotatably mounted directly on the shaft, flexible driving means connecting the crank shaft with the propeller, and a removable shaft extension fixing the propeller axially on the crank shaft.

3. In an aeroplane propelling mechanism, a crank shaft, a propeller rotatably mounted on the shaft, flexible driving means connecting the crank shaft with the propeller, and means for fixing the propeller axially of the crank shaft including an adjustable member on the end of the crank shaft engaging the propeller.

4. In an aeroplane propelling mechanism, a crankshaft, a propeller mounted on an end of said shaft, and a starter jaw member secured to the shaft end and engaging said propeller to fix it axially on the shaft.

5. In an aeroplane propelling mechanism, a crank shaft having a hollow end, a propeller rotatably mounted on the hollow shaft end, a flexible driving connection between the shaft and the propeller, and a shaft extension screwed into the hollow end of said crank shaft, said extension having a thrust flange engaging the propeller to fix it axially of the crank shaft.

6. In an aeroplane propelling mechanism, a crankshaft having a hollow end, a propeller loosely mounted on the hollow end of the shaft, a driving connection between the shaft and the propeller, an axially adjustable shaft extension for positioning the propeller on the shaft, and anchor means securing said extension in adjusted relation with the shaft.

7. In an aeroplane propelling mechanism, a crankshaft having a hollow end, a propeller structure mounted loosely on the hollow end of said shaft, a driving connection between the shaft and the propeller, an axially adjustable shaft extension extending into the hollow end of said shaft, and anchor means securing said extension with the shaft.

8. In an aeroplane propelling mechanism, a crankshaft having a hollow end, a propeller structure mounted on the hollow end of said shaft, a driving connection between the shaft and the propeller, an extension screwed into the hollow end of the shaft, said extension being formed with a thrust bearing for the outer end of the propeller, a plug screwed in the hollow end of said shaft, and means for securing the extension to the plug.

9. In an aeroplane propelling mechanism, a crankshaft having a hollow end, a propeller structure mounted on the hollow end of said shaft, a driving connection between the shaft and the propeller, an adjustable extension screwed into the hollow end of the shaft, said extension having a thrust flange for retaining the propeller axially on the shaft, and anchor means for securing said extension to the shaft in desired adjusted relation.

In testimony whereof I affix my signature.

LIONEL M. WOOLSON.